(12) United States Patent
Kusui et al.

(10) Patent No.: US 12,710,633 B2
(45) Date of Patent: Aug. 18, 2026

(54) MICROSCOPE OBJECTIVE LENS, MICROSCOPE DEVICE, AND MICROSCOPE OPTICAL SYSTEM

(71) Applicant: NIKON CORPORATION, Tokyo (JP)

(72) Inventors: Yuta Kusui, Kamakura (JP); Kazuhiro Takasago, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 640 days.

(21) Appl. No.: 17/919,562

(22) PCT Filed: Apr. 13, 2021

(86) PCT No.: PCT/JP2021/015352
§ 371 (c)(1),
(2) Date: Oct. 18, 2022

(87) PCT Pub. No.: WO2021/215311
PCT Pub. Date: Oct. 28, 2021

(65) Prior Publication Data

US 2023/0152565 A1 May 18, 2023

(30) Foreign Application Priority Data

Apr. 20, 2020 (JP) ................................ 2020-074551

(51) Int. Cl.
*G02B 21/02* (2006.01)
*G02B 9/10* (2006.01)

(52) U.S. Cl.
CPC ............... *G02B 21/02* (2013.01); *G02B 9/10* (2013.01)

(58) Field of Classification Search
CPC ............ G02B 9/10; G02B 9/64; G02B 21/02
See application file for complete search history.

(56) References Cited

U.S. PATENT DOCUMENTS

2001/0050759 A1* 12/2001 Kamiya .............. G03F 7/70858 355/30
2010/0265574 A1 10/2010 Kasahara
(Continued)

FOREIGN PATENT DOCUMENTS

JP 2010-152247 A 7/2010
JP 2010-250136 11/2010
(Continued)

OTHER PUBLICATIONS

International Preliminary Report on Patentability and Written Opinion of the International Searching Authority, dated Jun. 29, 2021, in corresponding International Application No. PCT/JP2021/015352 (12 pp.).

(Continued)

*Primary Examiner* — Jack Dinh

(57) ABSTRACT

A microscope objective lens (OL) includes a first lens group (G1) and a second lens group (G2) arranged in order from the object side. The first lens group has positive refractive power and converts luminous flux from an object into convergent luminous flux. The second lens group has negative refractive power and converts the convergent luminous flux from the first lens group into parallel luminous flux. The microscope objective lens satisfies the following conditional expression: $14.0 \leq NA \times f$ 1.0$<H1/H0$ where NA is the numerical aperture of the microscope objective lens; f is the focal distance of the microscope objective lens; H1 is the maximum value of the height of marginal rays from an on-axis object point of the first lens group; and H0 is the height of marginal rays on the lens surface closest to the image side of the second lens group.

9 Claims, 11 Drawing Sheets

(56) References Cited

U.S. PATENT DOCUMENTS

| | | | |
|---|---|---|---|
| 2016/0116724 | A1 | 4/2016 | Abe |
| 2017/0322404 | A1 | 11/2017 | Abe |

FOREIGN PATENT DOCUMENTS

| | | | |
|---|---|---|---|
| JP | 2010-271693 | A | 12/2010 |
| JP | 2014-048342 | A | 3/2014 |
| JP | 2016-085335 | A | 5/2016 |

OTHER PUBLICATIONS

International Search Report, dated Jun. 29, 2021, in International Patent Application No. PCT/JP2021/015352 (4 pp.).

Extended European search report issued Apr. 9, 2024 in EP Patent Application No. 21792716.9.

Office Action dated Jul. 4, 2023 in counterpart Japanese Application No. 2022-516980.

Decision of Refusal issued Nov. 7, 2023 from the Japan Patent Office in the counterpart Japanese Application No. 2022-516980.

* cited by examiner

OL(1)
Cv
Ob
L11
L12
L13
L14
L15
CL11
L16
L17
L18
CL12
G1(+)
L21
L22
CL21
L23
L24
CL22
L25
G2(-)

OL(2)
IM
Ob
L11 L12
CL11
L13
L14 L15
CL12
L16 L17 L18
CL13
L19 L120
CL14
L121
G1(+)
L21 L22
CL21
L23 L24
CL22
G2(-)

MICROSCOPE OBJECTIVE LENS, MICROSCOPE DEVICE, AND MICROSCOPE OPTICAL SYSTEM

CROSS REFERENCE TO RELATED APPLICATIONS

This application is a U.S. National Stage Application which claims the benefit under 35 U.S.C. § 371 of International Patent Application No. PCT/JP2021/015352 filed on Apr. 13, 2021, which claims priority benefit from Japanese Patent Application No. 2020-074551 filed on Apr. 20, 2020, the contents of each of which are incorporated herein by reference.

TECHNICAL FIELD

The present invention relates to microscope objective lenses, microscope devices, and microscope optical systems.

TECHNICAL BACKGROUND

In recent years, various kinds of objective lenses have been proposed for microscopes having a wide field of view (for example, refer to Patent literature 1). Such objective lenses are required to have high resolution while keeping a wide field of view.

PRIOR ARTS LIST

Patent Document

Patent literature 1: Japanese Laid-Open Patent Publication No. 2016-85335(A)

SUMMARY OF THE INVENTION

A microscope objective lens according to the present invention comprises, in order from an object side: a first lens group that has positive refractive power and converts light flux from an object into convergent light flux; and a second lens group that has negative refractive power and receives the convergent light flux from the first lens group, wherein the following conditional expressions are satisfied:

$$14.0 \le NA \times f$$

$$1.0 < H1/H0$$

where NA: the numerical aperture of the microscope objective lens, f: the focal length of the microscope objective lens, H1: the maximum height of a marginal ray from an on-axis object point in the first lens group, and H0: the height of the marginal ray at a lens surface closest to an image in the second lens group.

A microscope device according to the present invention comprises the above microscope objective lens.

A microscope optical system according to the present invention comprises the above microscope objective lens, and an image formation lens that forms an image from light from the microscope objective lens.

DESCRIPTION OF THE EMBODIMENTS

Figure 1:
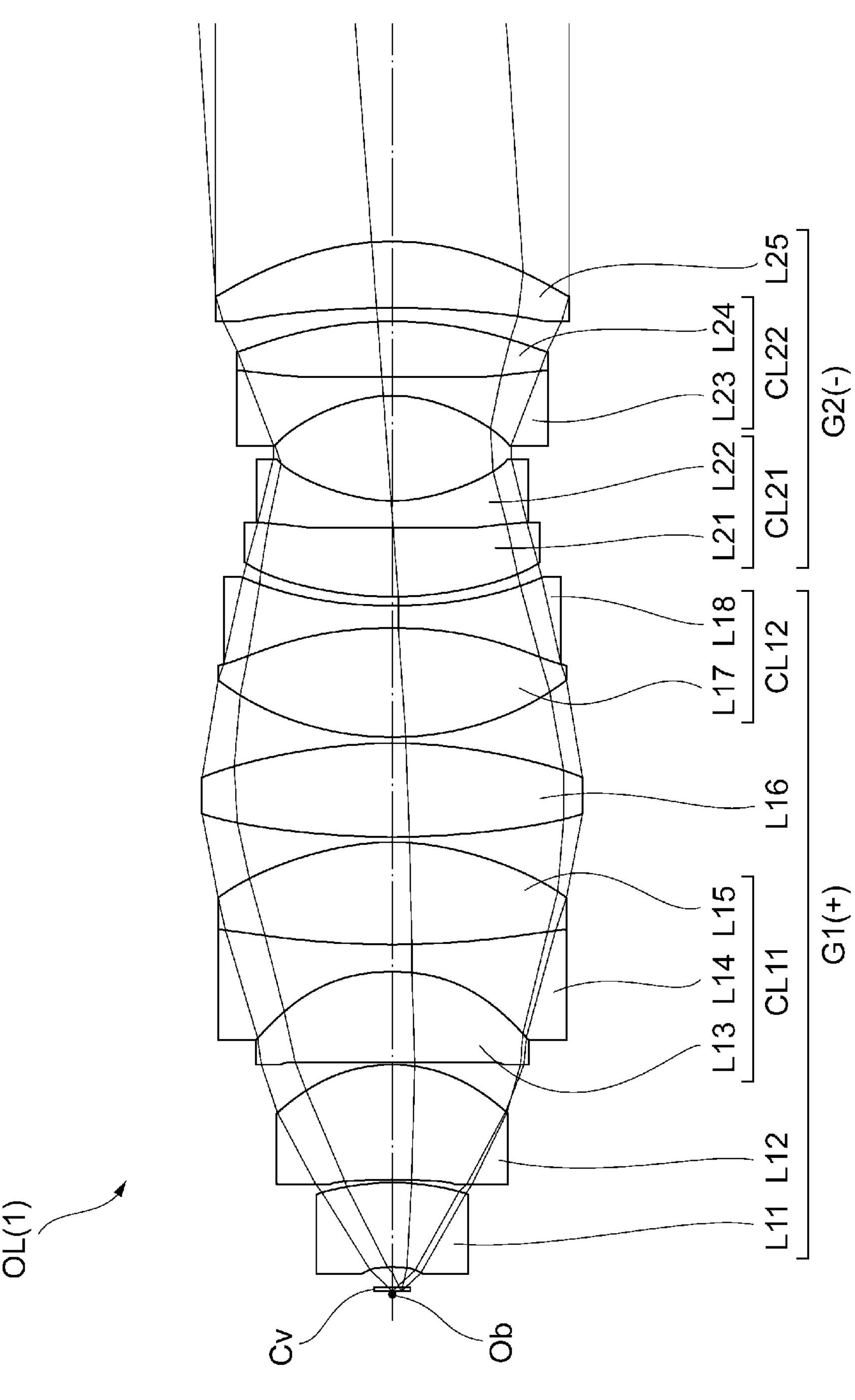
FIG. 1 is a cross-sectional diagram showing the configuration of a microscope objective lens according to a first example.

Hereinafter, a microscope objective lens, microscope device, and microscope optical system of each embodiment will be described with reference to the figures. Each embodiment describes a microscope objective lens, microscope device, and microscope optical system having a wide field of view and high resolution.

First, a microscope objective lens according to a first embodiment will be described. As an example of a microscope objective lens OL according to the first embodiment, a microscope objective lens OL (1) shown in FIG. 1 comprises, in order from the object side, a first lens group G1 having positive refractive power and a second lens group G2 having negative refractive power. The first lens group G1 collects divergent light flux from an object Ob and converts it into convergent light flux. The second lens group G2 receives the convergent light flux from the first lens group G1. The second lens group G2 may be practically configured to convert the convergent light flux from the first lens group G1 into parallel light flux. Note that in FIGS. 1, 3, 5, 7, and 10, the object Ob is an object point on the optical axis (in other words, an on-axis object point).

The microscope objective lens OL according to the first embodiment satisfies the following conditional expression (1) and conditional expression (2):

$$14.0 \le NA \times f \quad (1)$$

$$1.0 < H1/H0 \quad (2)$$

where NA: the numerical aperture of the microscope objective lens OL, f: the focal length of the microscope objective lens OL, H1: the maximum height of the marginal ray from the on-axis object point (Ob) in the first lens group G1, and H0: the height of the marginal ray at the lens surface closest to the image in the second lens group G2.

In the first embodiment, by satisfying conditional expression (1) and conditional expression (2), it is possible to provide a microscope objective lens having a wide field of view and high resolution. The microscope objective lens OL according to the first embodiment may be a microscope objective lens OL (2) shown in FIG. 3, a microscope objective lens OL (3) shown in FIG. 5, or a microscope objective lens OL (4) shown in FIG. 7.

Conditional expression (1) defines the relationship between the numerical aperture of the microscope objective lens OL and the focal length of the microscope objective lens OL. By satisfying conditional expression (1), it is possible to increase the resolution while keeping a wide field of view. Note that the unit of the lower limit of conditional expression (1) is [mm].

If the corresponding value of conditional expression (1) is smaller than the lower limit, in order to increase the numerical aperture of the microscope objective lens OL, the focal length of the microscope objective lens OL needs to be decreased, and this would narrow a field of view of the microscope objective lens OL. To ensure the effects of the present embodiment, the lower limit of conditional expression (1) may preferably be 15.0 [mm]. In addition, to ensure the effects of the present embodiment, the upper limit of conditional expression (1) may preferably be smaller than or equal to 20.0 [mm].

Conditional expression (2) defines the relationship between the maximum height of the marginal ray from the on-axis object point (Ob) in the first lens group G1 and the height of the marginal ray at the lens surface closest to the image in the second lens group G2. By satisfying conditional expression (2), it is possible to favorably correct the axial aberration such as the spherical aberration and the longitudinal chromatic aberration in the first lens group G1, and it is possible to favorably correct the off-axis aberration such as the field curves and the coma aberration in the second lens group G2. Note that in each embodiment, the marginal ray is the ray that is emitted from the on-axis object point (Ob) and passes through the edge of the entrance pupil (exit pupil) (in other words, the ray with which the numerical aperture is largest).

If the corresponding value of conditional expression (2) is smaller than the lower limit, the effect of correcting the axial aberration in the first lens group G1 is small, and thus, the burden of the aberration correction in the second lens group G2 is large. This makes it difficult to achieve both correction of the axial aberration and correction of the off-axis aberration. To ensure the effects of the present embodiment, the lower limit of conditional expression (2) may preferably be 1.05. In addition, to ensure the effects of the present embodiment, the upper limit of conditional expression (2) may preferably be smaller than 1.5.

The microscope objective lens OL according to the first embodiment may satisfy the following conditional expression (3):

$$0.45 \leq L1/TL \leq 0.75 \quad (3),$$

where L1: the distance on an optical axis from a lens surface closest to the object in the first lens group G1 to a lens surface at which the height of the marginal ray from the on-axis object point (Ob) largest in the first lens group G1, and TL: the distance on the optical axis from the lens surface closest to the object in the first lens group G1 to the lens surface closest to the image in the second lens group G2.

Conditional expression (3) defines the relationship between the distance on the optical axis from the lens surface closest to the object in the first lens group G1 to the lens surface at which the height of the marginal ray is largest in the first lens group G1 and the distance on the optical axis from the lens surface closest to the object in the first lens group G1 to the lens surface closest to the image in the second lens group G2. By satisfying conditional expression (3), it is possible to favorably correct the axial aberration such as the spherical aberration and the longitudinal chromatic aberration in the first lens group G1.

If the corresponding value of conditional expression (3) is smaller than the lower limit, the power of lenses on the object side in the first lens group G1 is high, and this would cause higher-order axial aberration. To ensure the effects of the present embodiment, the lower limit of conditional expression (3) may preferably be 0.5.

If the corresponding value of conditional expression (3) is larger than the upper limit, in order to cause the light sufficiently converged by the first lens group G1 to enter the second lens group G2, the power of the lenses located closer to the image needs to be higher than the lens surface at which the height of the marginal ray is largest in the first lens group G1, and this would cause higher-order axial aberration. To ensure the effects of the present embodiment, the upper limit of conditional expression (3) may preferably be 0.7.

In the microscope objective lens OL according to the first embodiment, the second lens group G2 may comprise, in order from the object side, a first lens component with a concave lens surface on an image side and a second lens component with a concave lens surface on the object side and satisfy the following conditional expression (4):

$$0.75 \leq L2/TL \leq 0.90 \quad (4),$$

where L2: the distance on an optical axis from a lens surface closest to the object in the first lens group G1 to one lens surface, out of the lens surface on the image side of the first lens component and the lens surface on the object side of the second lens component, the height of the marginal ray from the on-axis object point (Ob) at the one lens surface being smaller than at the other, and TL: the distance on the optical axis from the lens surface closest to the object in the first lens group G1 to the lens surface closest to the image in the second lens group G2.

Conditional expression (4) defines the relationship between the distance on the optical axis from the lens surface closest to the object in the first lens group G1 to the one lens surface, out of the lens surface on the image side of the first lens component and the lens surface on the object side of the second lens component, at which the height of the marginal ray from the on-axis object point (Ob) is smaller than at the other and the distance on the optical axis from the lens surface closest to the object in the first lens group G1 to the lens surface closest to the image in the second lens group G2. By satisfying conditional expression (4), it is possible to favorably correct the off-axis aberration such as the field curves and the coma aberration in the second lens group G2. Note that in each embodiment, a lens component means a simple lens or a cemented lens. The first lens component may be located closest to the object in the second lens group G2, and the second lens component may be located next to and on the image side of the first lens component.

If the corresponding value of conditional expression (4) is smaller than the lower limit, the power of the lenses located between the lens surface at which the height of the marginal ray is largest and the lens surface at which the height of the marginal ray is smallest needs to be high, and this would cause higher-order off-axis aberration.

If the corresponding value of conditional expression (4) is larger than the upper limit, the negative power of lenses on the image side of the second lens group G2 needs to be higher, and this would cause higher-order off-axis aberration. To ensure the effects of the present embodiment, the upper liza it of conditional expression (4) may preferably be 0.8.

The microscope objective lens OL according to the first embodiment may satisfy the following conditional expression (5):

$$0.75<f1/f<1.20 \quad (5),$$

where f1: the focal length of the first lens group G1.

Conditional expression (5) defines the relationship between the focal length of the first lens group G1 and the focal length of the microscope objective lens OL. By satisfying conditional expression (5), it is possible to favorably correct the axial aberration such as the spherical aberration and the longitudinal chromatic aberration in the first lens group G1.

If the corresponding value of conditional expression (5) is smaller than the lower limit, the refractive power of the first lens group G1 is too high, and this would cause higher-order axial aberration.

If the corresponding value of conditional expression (5) is larger than the upper limit, it would cause higher-order axial aberration. To ensure the effects of the present embodiment, the upper limit of conditional expression (5) may preferably be 0.9.

Next, a microscope objective lens according to a second embodiment will be described. As an example of a microscope objective lens OL according to the second embodiment, a microscope objective lens OL (1) shown in FIG. 1 comprises, in order from the object side, a first lens group G1 having positive refractive power and a second lens group G2 having negative refractive power. The first lens group G1 collects divergent light flux from an object Ob and converts it into convergent light flux. The second lens group G2 receives the convergent light flux from the first lens group G1. The second lens group G2 may be practically configured to convert the convergent light flux from the first lens group G1 into parallel light flux.

The microscope objective lens OL according to the second embodiment satisfies the foregoing conditional expression (1) and conditional expression (3). In the second embodiment, by satisfying conditional expression (1) and conditional expression (3), it is possible to provide a microscope objective lens having a wide field of view and high resolution. The microscope objective lens OL according to the second embodiment may be the microscope objective lens OL (2) shown in FIG. 3, the microscope objective lens OL (3) shown in FIG. 5, or the microscope objective lens OL (4) shown in FIG. 7. The microscope objective lens OL according to the second embodiment may satisfy the foregoing conditional expression (2), may satisfy the foregoing conditional expression (4), and may satisfy the foregoing conditional expression (5).

Next, a microscope objective lens according to a third embodiment will be described. As an example of a microscope objective lens OL according to the third embodiment, the microscope objective lens OL (1) shown in FIG. 1 comprises, in order from the object side, a first lens group G1 having positive refractive power and a second lens group G2 having negative refractive power. The first lens group G1 collects divergent light flux from an object Ob and converts it into convergent light flux. The second lens group G2 receives the convergent light flux from the first lens group G1. The second lens group G2 comprises, in order from the object side, a first lens component having a concave lens surface on the image side and a second lens component having a concave lens surface on the object side. The second lens group G2 may be practically configured to convert the convergent light flux from the first lens group G1 into parallel light flux.

The microscope objective lens OL according to the third embodiment satisfies the foregoing conditional expression (1) and conditional expression (4). In the third embodiment, by satisfying conditional expression (1) and conditional expression (4), it is possible to provide a microscope objective lens having a wide field of view and high resolution. The microscope objective lens OL according to the third embodiment may be the microscope objective lens OL (2) shown in FIG. 3, the microscope objective lens OL (3) shown in FIG. 5, or the microscope objective lens OL (4) shown in FIG. 7. The microscope objective lens OL according to the third embodiment may satisfy the foregoing conditional expression (2), may satisfy the foregoing conditional expression (3), and may satisfy the foregoing conditional expression (5).

Next, a microscope objective lens according to a fourth embodiment will be described. As an example of a microscope objective lens OL according to the fourth embodiment, the microscope objective lens OL (1) shown in FIG. 1 comprises, in order from the object side, a first lens group G1 having positive refractive power and a second lens group G2 having negative refractive power. The first lens group G1 collects divergent light flux from an object Ob and converts it into convergent light flux. The second lens group G2 receives the convergent light flux from the first lens group G1. The second lens group G2 may be practically configured to convert the convergent light flux from the first lens group G1 into parallel light flux.

The microscope objective lens OL according to the fourth embodiment satisfies the foregoing conditional expression (1) and conditional expression (5). In the fourth embodiment, by satisfying conditional expression (1) and conditional expression (5), it is possible to provide a microscope objective lens having a wide field of view and high resolution. The microscope objective lens OL according to the fourth embodiment may be the microscope objective lens OL (2) shown in FIG. 3, the microscope objective lens OL (3) shown in FIG. 5, or the microscope objective lens OL (4) shown in FIG. 7. The microscope objective lens OL according to the fourth embodiment may satisfy the foregoing conditional expression (2), may satisfy the foregoing conditional expression (3), or may satisfy the foregoing conditional expression (4).

In the microscope objective lenses OL according to the first to fourth embodiments, the first lens group G1 may comprise at least one meniscus lens, at least one positive simple lens, and at least one cemented lens, and the cemented lens may comprise a positive lens and a negative lens. In addition, the configuration may be such that the height of the light emitted from the object point on the optical axis is largest in the first lens group G1.

In the microscope objective lenses OL according to the first to fourth embodiments, at least one of the first lens component and the second lens component included in the second lens group G2 may be a cemented lens. The lens surface closest to the image in the second lens group G2 may have a convex surface on the image side.

Figure 10:
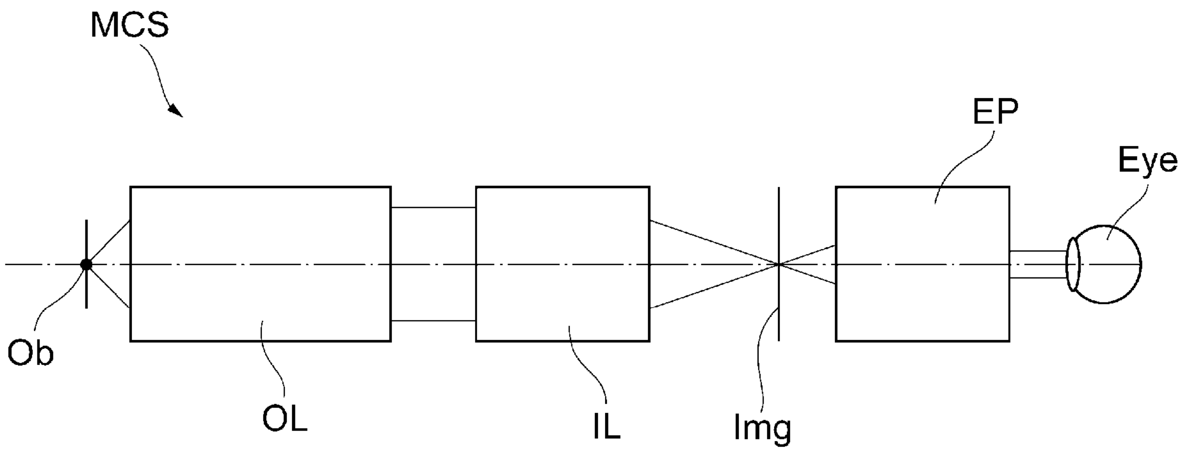
FIG. 10 is a schematic configuration diagram showing a microscope optical system.

Next, a microscope optical system according to the present embodiments will be described. As shown in FIG. 10, a microscope optical system MCS according to the present embodiment comprises, in order from the object side, a microscope objective lens OL according to one of the embodiments and an image formation lens IL. The microscope objective lens OL converts light from the object Ob into parallel light. The image formation lens IL collects the light from the microscope objective lens OL and forms an image of the object on an image surface Img. The image formation lens IL collects the light from the objective lens OL and forms an image of the object Ob on the image surface Img. The image of this object Ob is observed by the observer' eye Eye through an eyepiece EP. The image of the object Ob may be formed not only through the eyepiece EP but it may be formed again on a second image surface where an image sensor (not show) is located, for example, by using a relay lens (not shown). The microscope optical system MCS according to the present embodiment comprises a microscope objective lens OL according to one of the embodiments. This makes it possible to provide a microscope optical system having a wide field of view and high resolution.

Next, a microscope device according to the present embodiment will be described. As an example of a microscope device, a fluorescence microscope 100 will be described with reference to FIG. 11. The fluorescence microscope 100 comprises a stage 101, a light source 111, an illumination optical system 121, a microscope optical system 131, an eyepiece 141, and an imaging device 151. On the stage 101 is placed, for example, a sample SA held between a microscope slide (not shown) and a cover glass (not shown). The sample SA placed on the stage 101 may be contained together with immersion liquid in a sample container (not shown). The sample SA includes fluorescent substances such as a fluorescent dye. The sample SA is, for example, cells fluorescently stained in advance or the like.

The light source 111 generates excitation light in a specified wavelength band. The specified wavelength band is set to a wavelength band that enables excitation of the sample SA including fluorescent substances. The excitation light emitted from the light source 111 enters the illumination optical system 121.

The illumination optical system 121 illuminates the sample SA on the stage 101 with the excitation light emitted from the light source 111. The illumination optical system 121 comprises a collimator lens 122 and a dichroic mirror 124 in order from the light source 111 side toward the sample SA side. The illumination optical system 121 comprises an objective lens 132 which is also included in the microscope optical system 131. The collimator lens 122 collimates the excitation light emitted from the light source 111.

The dichroic mirror 124 has characteristics of reflecting the excitation light from the light source 111 and transmitting the fluorescence from the sample SA. The dichroic mirror 124 reflects the excitation light from the light source 111 toward the sample SA on the stage 101. The dichroic mirror 124 transmits fluorescence generated at the sample SA toward a mirror 133 of the microscope optical system 131. Between the dichroic mirror 124 and the collimator lens 122 is arranged an excitation filter 123 that transmits the excitation light from the light source 111. Between the dichroic mirror 124 and the mirror 133 is arranged a fluorescence filter 125 that transmits the fluorescence from the sample SA.

The microscope optical system 131 comprises the objective lens 132, the mirror 133, a first image formation lens 134A, and a second image formation lens 134B. The microscope optical system 131 also comprises the dichroic mirror 129 which is also included in the illumination optical system 121. The objective lens 132 is located above the stage 101 on which the sample SA is placed so as to face the stage 101. The objective lens 132 condenses the excitation light from the light source 111 and illuminates the sample SA on the stage 101. The objective lens 132 receives fluorescence generated on the sample SA and converts it into parallel light.

The mirror 133 is, for example, configured using a half mirror having a ratio of transmittance to reflectance set to 1:1. Apart of the fluorescence incident on the mirror 133 passes through the mirror 133 and enters the first image formation lens 134A. The fluorescence having passed through the first image formation lens 134A forms an image on a first image surface ImgA. The observer can observe an image of the sample SA formed on the first image surface ImgA, using the eyepiece 141. The other part of the fluorescence incident on the mirror 133 is reflected by the mirror 133 and enters the second image formation lens 134B. The fluorescence having passed through the second image formation lens 134B forms an image on a second image surface ImgB. At the second image surface ImgB is located an area sensor 152 of the imaging device 151.

Note that the mirror 133 is not limited to a half mirror but may be configured using an optical-path switching mirror capable of selectively switching the reflection direction of light. In this case, the mirror 133 reflects the fluorescence from the sample SA alternately toward one of the first image formation lens 134A and the second image formation lens 134B by switching.

The imaging device 151 comprises an image sensor 152. The image sensor 152 comprises an imaging device such as a COD or a CMOS. The imaging device 151 is capable of capturing an image of the sample SA formed on the second image surface ImgB by using the image sensor 152.

In the fluorescence microscope 100 thus configured, the excitation light emitted from the light source 111 passes through the collimator lens 122 and becomes parallel light. The excitation light having passed through the collimator lens 122 passes through the excitation filter 123 and becomes incident on the dichroic mirror 124. The excitation light incident on the dichroic mirror 124 is reflected on the dichroic mirror 124 and passes through the objective lens 132. The excitation light having passed through the objective lens 132 is projected onto the sample SA on the stage 101. With this configuration, the illumination optical system 121 illuminates the sample SA on the stage 101 with the excitation light emitted from the light source 111.

The illumination with excitation light excites the fluorescent substances included in the sample SA, and fluorescence is emitted. Fluorescence from the sample SA passes through the objective lens 132 and becomes parallel light. The fluorescence having passed through the objective lens 132 becomes incident on the dichroic mirror 124. The fluorescence incident on the dichroic mirror 124 passes through the dichroic mirror 124, passes through the fluorescence filter 125, and becomes incident on the mirror 133.

Part of the fluorescence incident on the mirror 133 passes through the mirror 133 and enters the first image formation lens 134A. The fluorescence having passed through the first image formation lens 134A forms an image on the first image surface ImgA. The other part of the fluorescence incident on the mirror 133 passes through the mirror 133 and enters the second image formation lens 134B. The fluorescence having passed through the second image formation lens 134B forms an image on the second image surface ImgB.

The observer observes an image of the sample SA formed on the first image surface ImgA, using the eyepiece 141. The imaging device 151 captures an image of the sample SA formed on the second image surface ImgB, using the image sensor 152. This fluorescence microscope 100 comprises a microscope objective lens OL according to one of the embodiments as the objective lens 132. This makes it possible to provide a microscope device having a wide field of view and high resolution.

Note that in the case in which a field of view is wide, and the resolution is high, the amount of information on an image of the sample SA obtained by the imaging device 151 is large. To deal with it, use of a time delay integration (TDI) image sensor for the image sensor 152 makes it possible to obtain an image of the sample SA in a short time.

Figure 11:
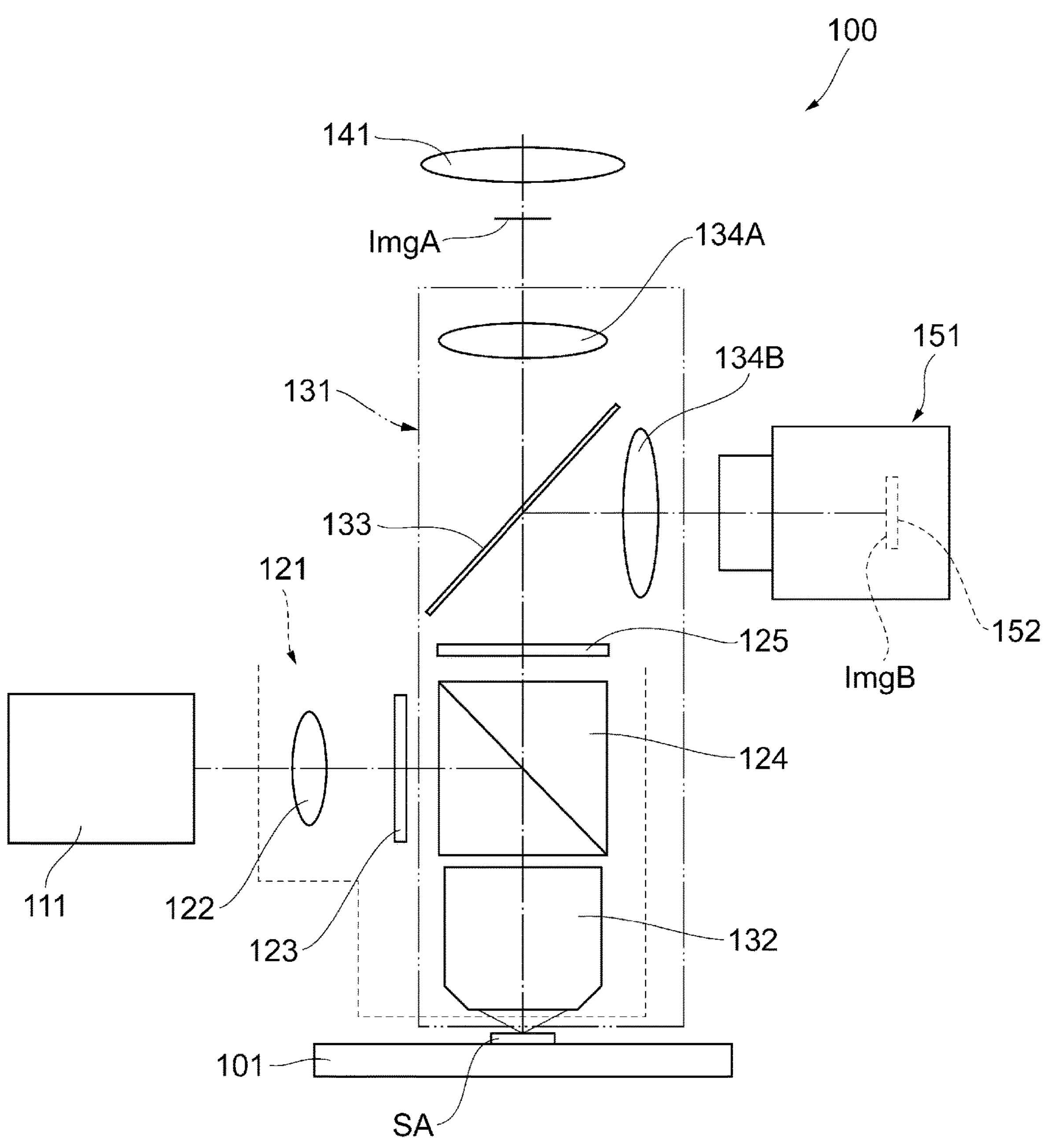
FIG. 11 is a schematic configuration diagram showing a fluorescence microscope which is an example of a microscope device.

The fluorescence microscope 100 has been described as an example of the microscope device according to the present embodiment, but the present disclosure is not limited to this example. For example, the microscope device according to the present embodiment may be a multiphoton excitation microscope, a light sheet microscope, a phase contrast microscope, a confocal microscope, a super resolution microscope, or the like. The fluorescence microscope 100 is not limited to an upright microscope as shown in FIG. 11 but may be an inverted microscope. With the present embodiment, as described above, it is possible to build microscope systems having various functions.

EXAMPLES

Hereinafter, examples of the microscope objective lenses OL according to the first to fourth embodiments will be described with reference to the drawings. FIGS. 1, 3, 5, and 7 are cross-sectional diagrams showing the configurations of the microscope objective lenses OL (OL (1) to OL (4)) according to the first to fourth examples. In FIGS. 1, 3, 5, and 7, each lens group is indicated by a combination of a symbol G and a number (or an alphabet), and each lens is indicated by a combination of a symbol L and a number (or an alphabet). In this case, to avoid cumbersome situations using many kinds of symbols and numbers and using large numbers, combinations of symbols and numbers are used independently in each example to indicate lenses or others. Thus, even if a combination of the same symbol and number are used n some of the examples, it does not mean the same constituent.

Below are shown Tables 1 to 4, in which Table 1 shows the specification data on the first example, Table 2 on the second example, Table 3 on the third example, and Table 4 on the fourth example. In each example, to calculate aberration characteristics, d-line (wavelength λ=587.6 nm), g-line (wavelength λ=435.8 nm), C-line (wavelength λ=656.3 nm), and F-line (wavelength λ=486.1 nm) are selected.

In the table of [General Data], β represents the magnification, and NA represents the numerical aperture. D0 is the working distance, which means the distance on the optical axis from the object Ob (excluding the thickness of the cover glass) to the lens surface closest to the object in the microscope objective lens OL (which is a first surface described later). The symbol f represents the focal length of the microscope objective lens OL. The symbol f1 represents the focal length of the first lens group G1. The symbol f2 represents the focal length of the second lens group G2. TL represents the distance on the optical axis from the lens surface closest to the object in the first lens group G1 to the lens surface closest to the image in the second lens group G2. L1 represents the distance on the optical axis from the lens surface closest to the object in the first lens group G1 to the lens surface at which the height of the marginal ray is largest in the first lens group G1. L2 represents the distance on the optical axis from the lens surface closest to the object in the first lens group G1 to one lens surface, out of the lens surface on the image side of the first lens component and the lens surface on the object side of the second lens component in the second lens group G2, the height of the marginal ray being smaller at the one lens surface than at the other. H1 represents the maximum height of the marginal ray in the first lens group G1. H0 represents the height of the marginal ray at the lens surface closest to the image in the second lens group G2.

In the table of [Lens Data], the surface number indicates the order of the lens surface from the object side, R indicates the curvature radius corresponding to each surface number (R has a positive value if the lens surface is convex toward the object), D indicates the lens thickness or the air gap on the optical axis, corresponding to each surface number, nd indicates the refractive index of the optical material corresponding to the surface number at d-line (wavelength λ=587.6 nm), and νd indicates the Abbe number of the optical material corresponding to each surface number based on d-line. The symbol "∞" in the curvature radius indicates a flat surface or an opening. Mentioning that the refractive index of air nd=1.00000 is omitted.

In all the specification values below, the unit of the focal length f, curvature radius R, surface distance D, other lengths, and the like listed is generally "mm" unless otherwise specified. However, the unit is not limited to this one because the same or similar optical performance can be obtained even if an optical system is proportionally enlarged or proportionally reduced in size.

The explanation on the tables up to this point is common in all of the examples, and hence repetitive description will be omitted below.

First Example

A first example will be described with reference to FIGS. 1 and 2 and Table 1. FIG. 1 is a cross-sectional diagram showing the configuration of a microscope objective lens according to the first example. The microscope objective lens OL (1) according to the first example comprises, in order from the object side along the optical axis, a first lens group G1 having positive refractive power and a second lens group G2 having negative refractive power. The space between the distal end of the microscope objective lens OL (1) according to the first example and a cover glass Cv covering the object Ob is filled with air. Note that it is assumed that the refractive index of the cover glass Cv at d-line (wavelength λ=587.6 nm) is 1.52, and the thickness of the cover glass Cv is 0.17 mm.

The first lens group G1 collects divergent light flux from the object Ob and converts it into convergent light flux. The first lens group G1 comprises, in order from the object side, a negative meniscus lens L11 with a concave surface on the object side; a positive meniscus lens L12 with a concave surface on the object side; a first cemented lens CL11 having a positive meniscus lens L13 with a concave surface on the object side, a biconcave negative lens L14, and a biconvex positive lens L15, joined together; a biconvex positive lens L16; and a second cemented lens CL12 having a biconvex positive lens L17 and a biconcave negative lens L18 joined together.

The second lens group G2 converts the convergent light flux from the first lens group G1 into parallel light flux. The second lens group G2 comprises, in order from the object side, a first cemented lens CL21 having a positive meniscus lens L21 with a convex surface on the object side and a negative meniscus lens L22 with a convex surface on the object side, joined together; a second cemented lens CL22 having a biconcave negative lens L23 and a biconvex positive lens L24 joined together; and a positive meniscus lens L25 with a concave surface on the object side. The first cemented lens CL21 corresponds to the first lens component in each embodiment. The second cemented lens CL22 corresponds to the second lens component in each embodiment.

The following Table 1 shows the specification values of the microscope objective lens according to the first example.

TABLE 1

[General Data]

β = 10 times
NA = 0.75
D0 = 1.70
f = 20.00
f1 = 15.25
f2 = −140.27
TL = 86.84
L1 = 44.56
L2 = 65.11
H1 = 16.25
H0 = 15.01

[Lens Data]

| Surface Number | R | D | nd | νd |
|---|---|---|---|---|
| 1 | −9.455 | 7.36 | 1.7283 | 28.38 |
| 2 | −20.308 | 0.20 | | |
| 3 | −72.385 | 9.72 | 1.5932 | 67.90 |
| 4 | −14.062 | 0.20 | | |
| 5 | −621.234 | 7.73 | 1.4560 | 91.36 |
| 6 | −14.527 | 2.38 | 1.5530 | 55.07 |
| 7 | 86.281 | 8.47 | 1.4343 | 95.02 |
| 8 | −26.160 | 0.50 | | |
| 9 | 68.673 | 8.00 | 1.4978 | 82.57 |
| 10 | −44.093 | 0.50 | | |
| 11 | 25.941 | 9.20 | 1.4343 | 95.02 |
| 12 | −33.618 | 1.87 | 1.5530 | 55.07 |
| 13 | 35.321 | 0.80 | | |
| 14 | 32.223 | 5.68 | 1.5932 | 67.90 |
| 15 | 140.892 | 2.49 | 1.6127 | 44.46 |
| 16 | 17.005 | 8.70 | | |
| 17 | −14.702 | 1.60 | 1.6730 | 38.26 |
| 18 | 180.493 | 4.74 | 1.4875 | 70.31 |
| 19 | −32.520 | 1.19 | | |
| 20 | −81.976 | 5.51 | 1.8503 | 32.35 |
| 21 | −25.735 | | | |

Figure 2:
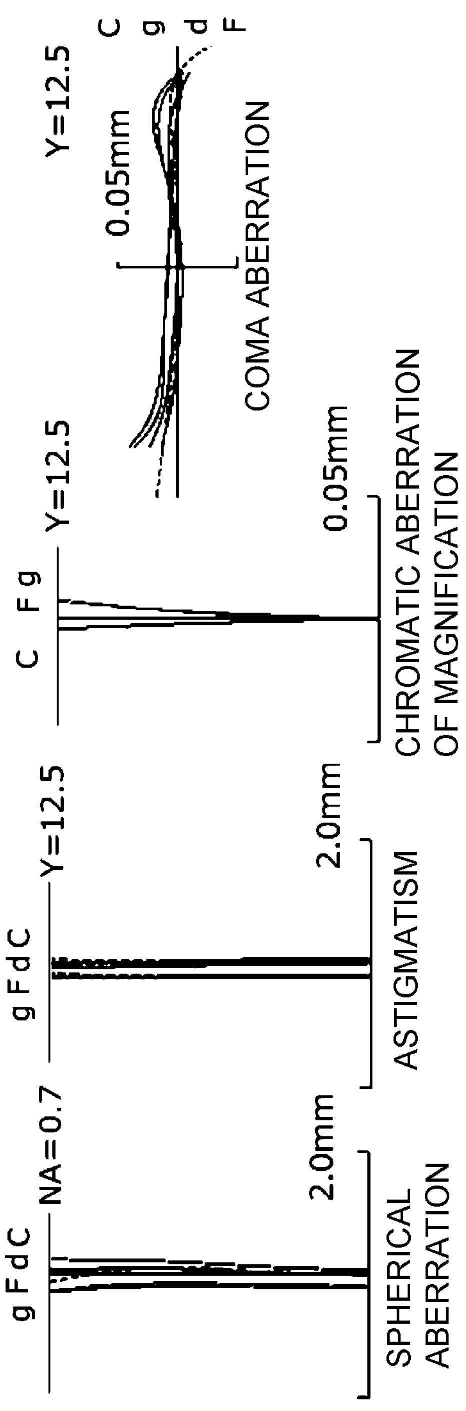
FIG. 2 is a diagram showing several kinds of aberration of the microscope objective lens according to the first example.

FIG. 2 is a diagram showing several kinds of aberration (spherical aberration, astigmatism, chromatic aberration of magnification, and coma aberration) of a microscope objective lens according to the first example. This diagram shows the several kinds of aberration in a state in which the microscope objective lens is combined with an image formation lens. In each aberration diagram in FIG. 2, NA represents the numerical aperture and Y represents the image height, and d indicates the aberration at d-line (wavelength λ=587.6 nm), g at g-line (wavelength λ=435.8 nm), C at C-line (wavelength λ=656.3 nm), and F at F-line (wavelength λ=486.1 nm). In the spherical aberration diagram, the vertical axis represents the normalized value with the maximum value of the entrance pupil diameter set to 1, and the horizontal axis represents the aberration value [mm] of each ray. In the astigmatism diagram, a solid line represents the meridional image surface for each wavelength, and a dashed line represents the sagittal image surface for each wavelength. In the astigmatism diagram, the vertical axis represents the image height [mm], and the horizontal axis represents the aberration value [mm]. In the diagram of chromatic aberration of magnification, the vertical axis represents the image height [mm], and the horizontal axis represents the aberration value [mm]. The coma aberration diagram shows the aberration value [mm] in the case in which the image height Y is 12.5 mm. Note that the aberration diagrams of each example shown below use the same symbols as those in this example, and hence, repetitive description is omitted.

The aberration diagrams show that each aberration is favorably corrected in the microscope objective lens according to the first example even in the case of a large numerical aperture NA, and that thus the microscope objective lens according to the first example has excellent image-forming performance.

Second Example

Figure 3:
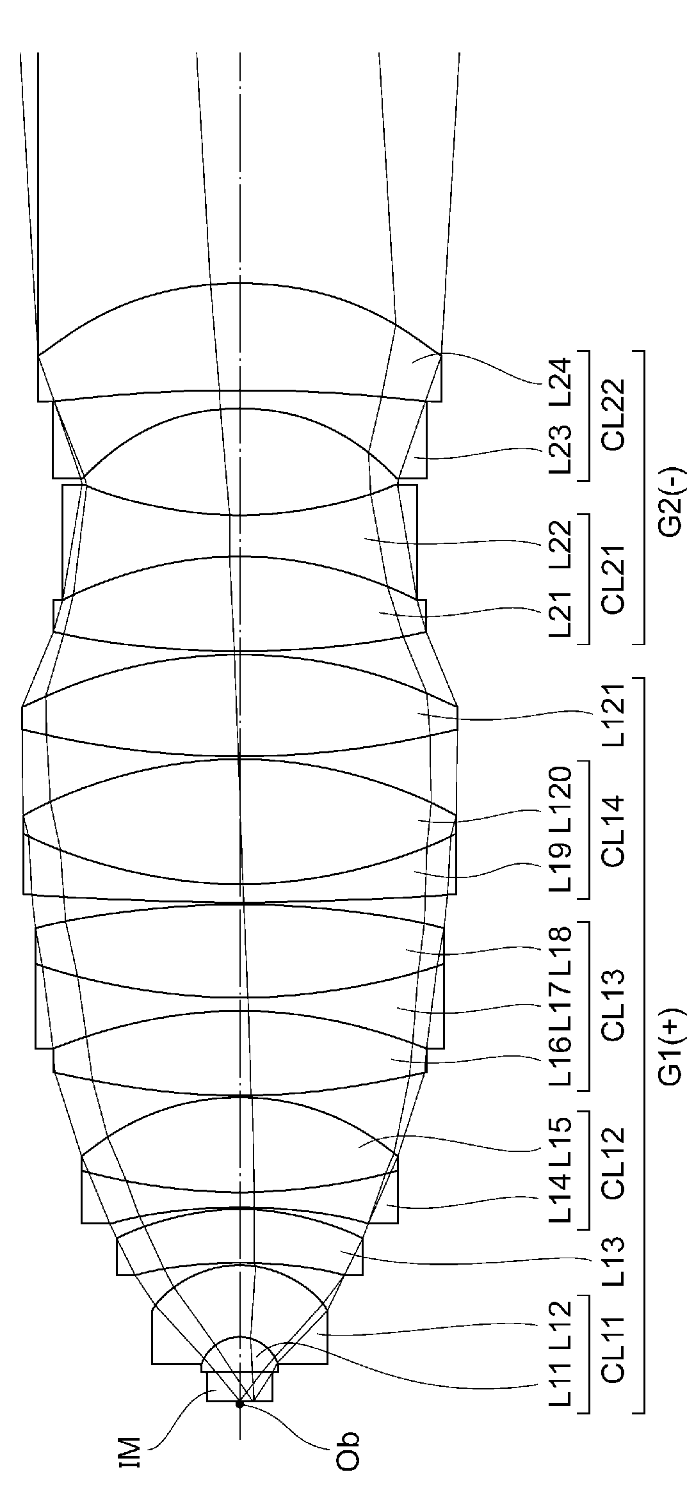
FIG. 3 is a cross-sectional diagram showing the configuration of a microscope objective lens according to a second example.

A second example will be described with reference to FIGS. 3 and 4 and Table 2. FIG. 3 is a cross-sectional diagram showing the configuration of a microscope objective lens according to the second example. The microscope objective lens OL (2) according to the second example comprises, in order from the object side, a first lens group G1 having positive refractive power and a second lens group G2 having negative refractive power. The space between the distal end of the microscope objective lens OL (2) according to the second example and the object Ob is filled with immersion liquid IM (water). Note that it is assumed that the refractive index of the immersion liquid IM (water) at d-line (wavelength λ=587.6 nm) is 1.33.

The first lens group G1 collects divergent light flux from the object Ob and converts it into convergent light flux. The first lens group G1 comprises, in order from the object side, a first cemented lens CL11 having a plano-convex positive lens L11 with a flat surface on the object side and a negative meniscus lens L12 with a concave surface on the object side, joined together; a positive meniscus lens L13 with a concave surface on the object side; a second cemented lens CL12 having a biconcave negative lens L14 and a biconvex positive lens L15 joined together; a third cemented lens CL13 having a biconvex positive lens L16, a biconcave negative lens L17, and a biconvex positive lens L18, joined together; a fourth cemented lens CL14 having a negative meniscus lens L19 with a convex surface on the object side and a biconvex positive lens L120 joined together; and a biconvex positive lens L121.

The second lens group G2 converts the convergent light flux from the first lens group G1 into parallel light flux. The second lens group G2 comprises, in order from the object side, a first cemented lens CL21 having a biconvex positive lens L21 and a biconcave negative lens L22 joined together; and a second cemented lens CL22 having a negative meniscus lens L23 with a concave surface on the object side and a positive meniscus lens L24 with a concave surface on the object side, joined together. The first cemented lens CL21 corresponds to the first lens component in each embodiment. The second cemented lens CL22 corresponds to the second lens component in each embodiment.

The following Table 2 shows the specification values of the microscope objective lens according to the second example.

TABLE 2

[General Data]

β = 10 times
NA = 0.85
D0 = 2.57
f = 20.00
f1 = 16.36
f2 = 55.47
TL = 94.07
L1 = 62.77
L2 = 74.57
H1 = 18.36
H0 = 17.14

[Lens Data]

| Surface Number | R | D | nd | νd |
|---|---|---|---|---|
| 1 | ∞ | 3.00 | 1.4585 | 67.85 |
| 2 | −3.310 | 6.00 | 2.0010 | 29.12 |
| 3 | −8.975 | 0.20 | | |
| 4 | −35.409 | 4.50 | 1.6180 | 63.34 |
| 5 | −22.000 | 0.20 | | |
| 6 | −40.270 | 1.20 | 1.7340 | 51.51 |
| 7 | 49.596 | 8.00 | 1.5691 | 71.31 |
| 8 | −19.999 | 0.20 | | |
| 9 | 66.659 | 7.00 | 1.4978 | 82.57 |
| 10 | −39.999 | 1.20 | 1.6230 | 58.12 |
| 11 | 54.987 | 7.80 | 1.4978 | 82.57 |
| 12 | −70.031 | 0.20 | | |
| 13 | 284.159 | 1.50 | 1.8160 | 46.62 |
| 14 | 41.499 | 10.50 | 1.4339 | 95.25 |
| 15 | −36.256 | 0.20 | | |
| 16 | 74.995 | 8.50 | 1.4978 | 82.57 |
| 17 | −40.229 | 0.30 | | |
| 18 | 75.627 | 8.00 | 1.4978 | 82.57 |
| 19 | −31.604 | 3.50 | 1.8160 | 46.59 |
| 20 | 36.639 | 9.00 | | |
| 21 | −17.876 | 1.50 | 1.5407 | 46.97 |
| 22 | −120.465 | 9.00 | 1.7495 | 35.33 |
| 23 | −26.266 | | | |

Figure 4:
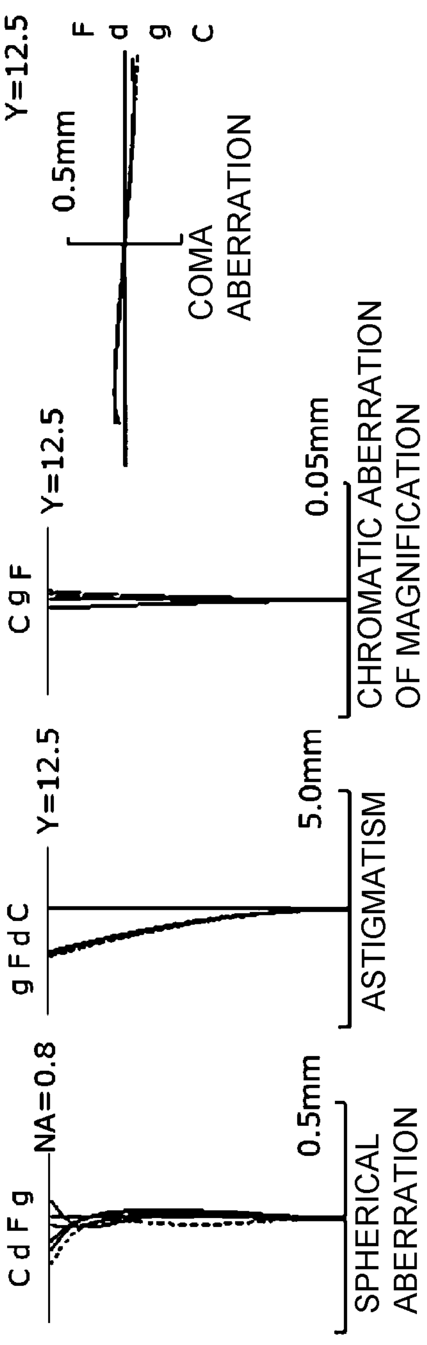
FIG. 4 is a diagram showing several kinds of aberration of the microscope objective lens according to the second example.

FIG. 4 is a diagram showing several kinds of aberration (spherical aberration, astigmatism, chromatic aberration of magnification, and coma aberration) of a microscope objective lens according to the second example. The aberration diagrams show that each aberration is favorably corrected in the microscope objective lens according to the second example even in the case of a large numerical aperture NA, and that thus the micro cope objective lens according to the second example has excellent image-forming performance.

Third Example

Figure 5:
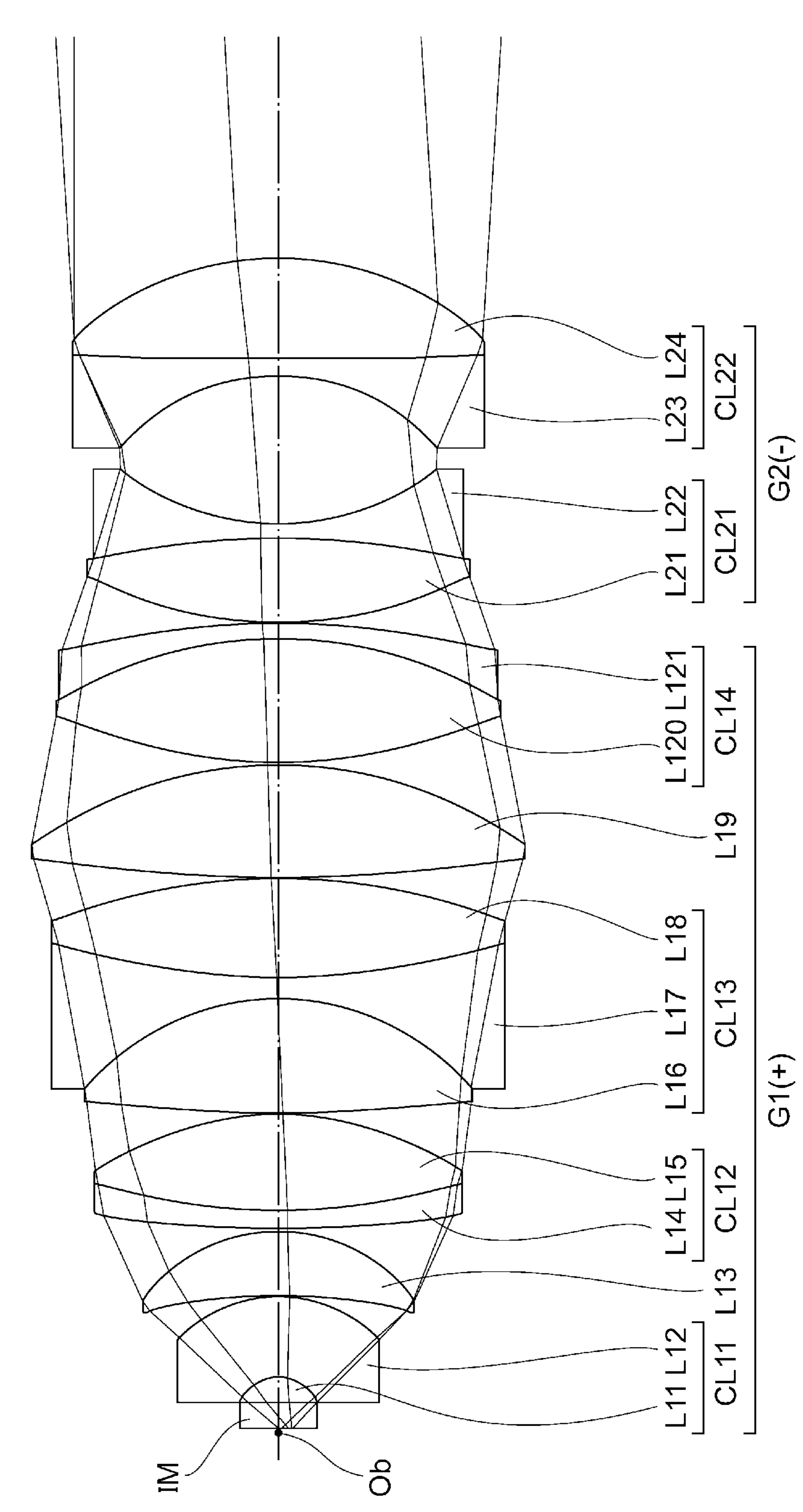
FIG. 5 is a cross-sectional diagram showing the configuration of a microscope objective lens according to a third example.

A third example will be described with reference to FIGS. 5 and 6 and Table 3. FIG. 5 is a cross-sectional diagram showing the configuration of a microscope objective lens according to the third example. The microscope objective lens OL (3) according to the third example comprises, in order from the object side, a first lens group G1 having positive refractive power and a second lens group G2 having negative refractive power. The space between the distal end of the microscope objective lens OL (3) according to the third example and the object Ob is filled with immersion liquid IM (water). Note that it is assumed that the refractive index of the immersion liquid 1M (water) at d-line (wavelength λ=587.6 nm) is 1.33.

The first lens group G1 collects divergent light flux from the object Ob and converts it into convergent light flux. The first lens group G1 comprises, in order from the object side, a first cemented lens CL11 having a plano-convex positive lens L11 with a flat surface on the object side and a negative meniscus lens L12 with a concave surface on the object side, joined together; a positive meniscus lens L13 with a concave surface on the object side; a second cemented lens CL12 having a negative meniscus lens L14 with a convex surface on the object side and a biconvex positive lens L15 joined together; a third cemented lens CL13 having a biconvex positive lens L16, a biconcave negative lens L17, and a biconvex positive lens L18 joined together; a biconvex positive lens L19; and a fourth cemented lens CL14 having a biconvex positive lens L120 and a negative meniscus lens L121 with a concave surface on the object side, joined together.

The second lens group G2 converts the convergent light flux from the first lens group G1 into parallel light flux. The second lens group G2 comprises, in order from the object side, a first cemented lens CL21 having a biconvex positive lens L21 and a biconcave negative lens L22 joined together; and a second cemented lens CL22 having a biconcave negative lens L23 and a biconvex positive lens L24 joined together. The first cemented lens CL21 corresponds to the first lens component in each embodiment. The second cemented lens CL22 corresponds to the second lens component in each embodiment.

The following Table 3 shows the specification values of the microscope objective lens according to the third example.

TABLE 3

[General Data]

β = 12 times
NA = 1.00
D0 = 2.30
f = 16.67
f1 = 16.86
f2 = 62.06
TL = 95.04
L1 = 53.90
L2 = 73.55
H1 = 20.14
H0 = 16.89

[Lens Data]

| Surface Number | R | D | nd | νd |
|---|---|---|---|---|
| 1 | ∞ | 2.00 | 1.4585 | 67.85 |
| 2 | −3.501 | 6.50 | 1.8830 | 40.76 |
| 3 | −11.493 | 0.15 | | |
| 4 | −37.602 | 5.20 | 1.5924 | 68.33 |
| 5 | −13.857 | 0.15 | | |
| 6 | 100.000 | 1.50 | 1.6935 | 53.21 |
| 7 | 49.191 | 7.80 | 1.4339 | 95.25 |
| 8 | −26.675 | 0.15 | | |
| 9 | 125.876 | 9.20 | 1.4978 | 82.57 |
| 10 | −20.736 | 1.80 | 1.7432 | 49.26 |
| 11 | 63.797 | 8.00 | 1.4339 | 95.25 |
| 12 | −50.110 | 0.15 | | |
| 13 | 132.395 | 9.00 | 1.4978 | 82.57 |
| 14 | −34.377 | 0.30 | | |
| 15 | 44.923 | 10.00 | 1.4343 | 95.02 |
| 16 | −34.217 | 1.20 | 1.8160 | 46.62 |
| 17 | −69.507 | 0.15 | | |
| 18 | 34.455 | 6.80 | 1.4978 | 82.57 |
| 19 | −66.192 | 1.20 | 1.7292 | 54.61 |
| 20 | 21.128 | 12.00 | | |
| 21 | −17.007 | 1.29 | 1.7340 | 51.51 |
| 22 | 434.518 | 8.20 | 1.8830 | 40.76 |
| 23 | −24.699 | | | |

Figure 6:
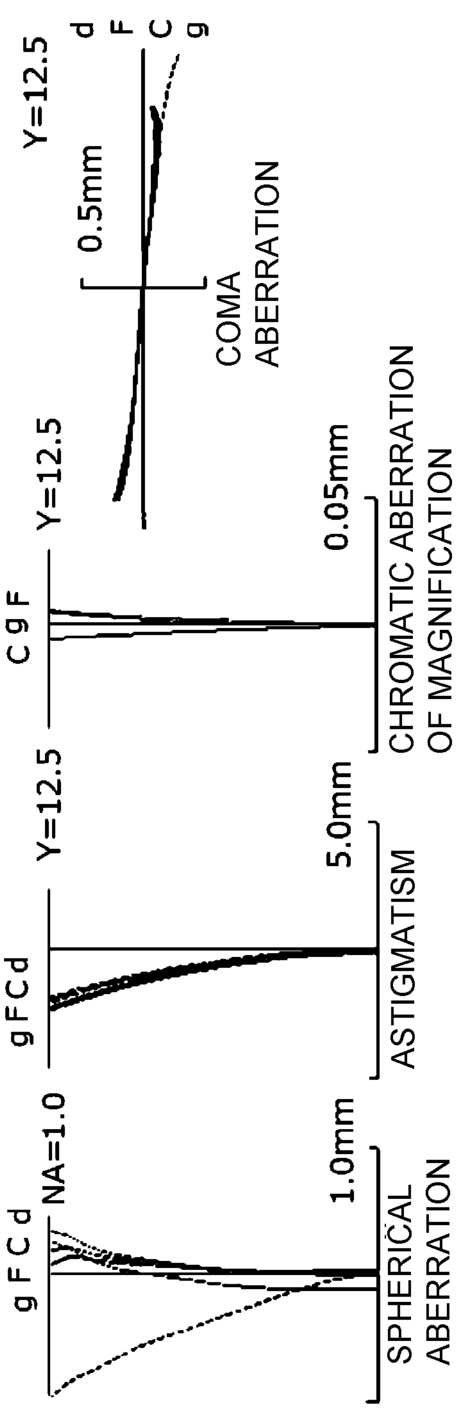
FIG. 6 is a diagram showing several kinds of aberration of the microscope objective lens according to the third example.

FIG. 6 is a diagram showing several kinds of aberration (spherical aberration, astigmatism, chromatic aberration of magnification, and coma aberration) of a microscope objective lens according to the third example. The aberration diagrams show that each aberration is favorably corrected in the microscope objective lens according to the third example even in the case of a large numerical aperture NA, and that thus the microscope objective lens according to the third example has excellent image-forming performance.

Fourth Example

Figure 7:
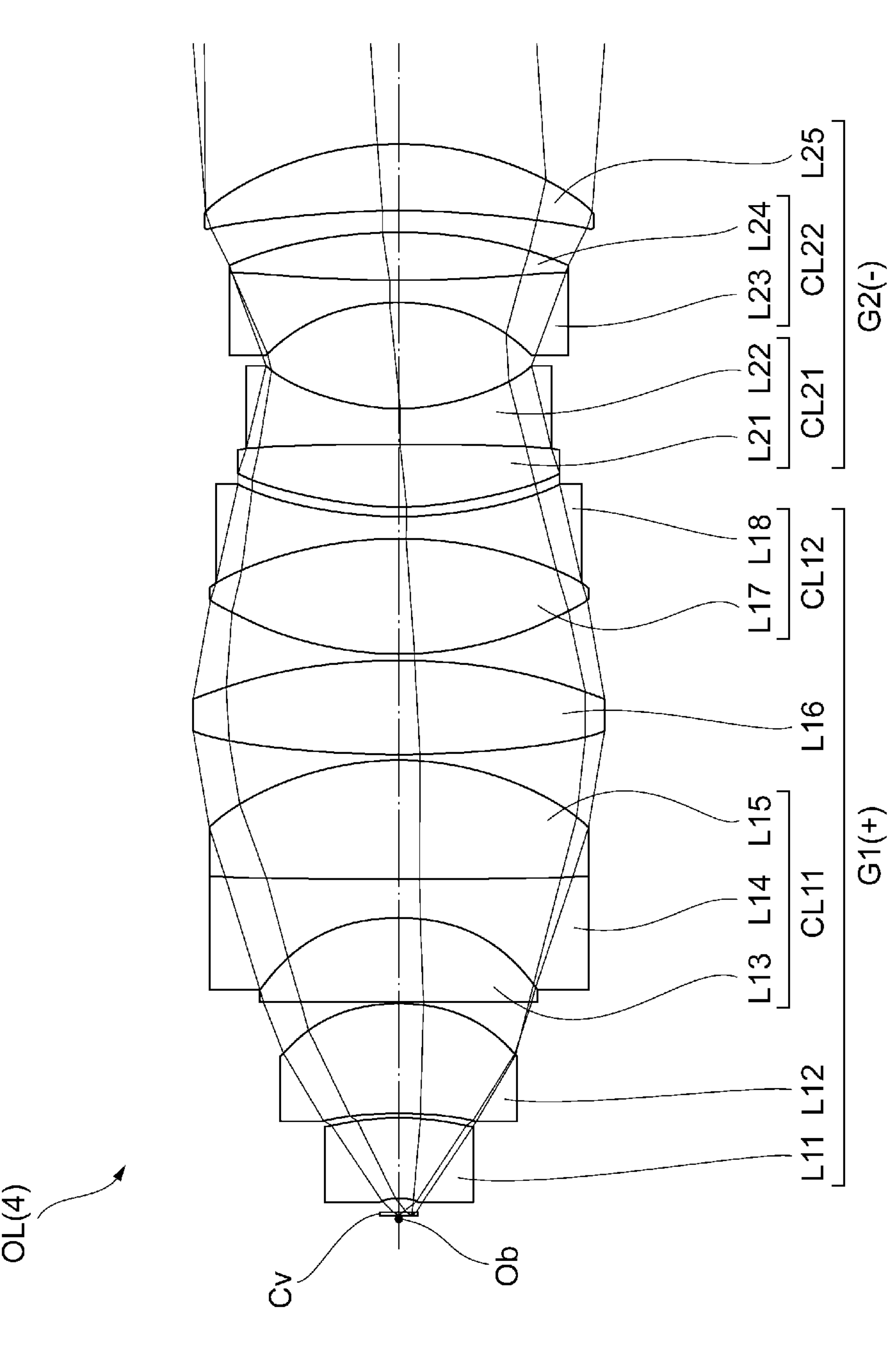
FIG. 7 is a cross-sectional diagram showing the configuration of a microscope objective lens according to a fourth example.

A fourth example will be described with reference to FIGS. 7 and 8 and Table 4. FIG. 7 is a cross-sectional diagram showing the configuration of a microscope objective lens according to the fourth example. The microscope objective lens OL (4) according to the fourth example comprises, in order from the object side, a first lens group G1 having positive refractive power and a second lens group G2 having negative refractive power. The space between the distal end of the microscope objective lens OL (4) according to the fourth example and the cover glass Cv covering the object Ob is filled with air. Note that it is assumed that the refractive index of the cover glass Cv at d-line (wavelength λ=587.6) is 1.52, and the thickness of the cover glass Cv is 0.17 mm.

The first lens group G1 collects divergent light flux from the object Ob and converts it into convergent light flux. The first lens group G1 comprises, in order from the object side, a negative meniscus lens L11 with a concave surface on the object side; a positive meniscus lens L12 with a concave surface on the object side; a first cemented lens CL11 having a positive meniscus lens L13 with a concave surface on the object side, a biconcave negative lens L14, and a biconvex positive lens L15, joined together; a biconvex positive lens L16; and a second cemented lens CL12 having a biconvex positive lens L17 and a biconcave negative lens L18 joined together.

The second lens group G2 converts the convergent light flux from the first lens group G1 into parallel light flux. The second lens group G2 comprises, in order from the object side, a first cemented lens CL21 having a biconvex positive lens L21 and a biconcave negative lens L22 joined together; a second cemented lens CL22 having a biconcave negative lens L23 and a biconvex positive lens L24 joined together; and a positive meniscus lens L25 with a concave surface on the object side. The first cemented lens CL21 corresponds to the first lens component in each embodiment. The second cemented lens CL22 corresponds to the second lens component in each embodiment.

The following Table 4 shows the specification values of the microscope objective lens according to the fourth example.

TABLE 4

| [General Data] |
|---|
| β = 10 times |
| NA = 0.80 |
| D0 = 1.22 |
| f = 20.00 |
| f1 = 15.26 |
| f2 = −184.75 |
| TL = 88.47 |
| L1 = 45.28 |
| L2 = 66.45 |
| H1 = 16.99 |
| H0 = 16.02 |

TABLE 4-continued

[Lens Data]

| Surface Number | R | D | nd | νd |
|---|---|---|---|---|
| 1 | −9.267 | 6.84 | 1.7283 | 28.38 |
| 2 | −21.308 | 0.20 | | |
| 3 | −50.864 | 9.45 | 1.5932 | 67.90 |
| 4 | −12.620 | 0.20 | | |
| 5 | −437.617 | 6.93 | 1.4560 | 91.36 |
| 6 | −13.531 | 3.13 | 1.5530 | 55.07 |
| 7 | 505.411 | 10.04 | 1.4343 | 95.02 |
| 8 | −24.935 | 0.50 | | |
| 9 | 77.838 | 8.00 | 1.4978 | 82.57 |
| 10 | −44.014 | 0.50 | | |
| 11 | 27.884 | 9.67 | 1.4343 | 95.02 |
| 12 | −30.538 | 1.90 | 1.5530 | 55.07 |
| 13 | 35.211 | 0.80 | | |
| 14 | 33.912 | 5.00 | 1.5932 | 67.90 |
| 15 | −613.951 | 3.30 | 1.6127 | 44.46 |
| 16 | 18.717 | 8.88 | | |
| 17 | −15.554 | 1.90 | 1.6730 | 38.26 |
| 18 | 198.283 | 3.95 | 1.4875 | 70.31 |
| 19 | −34.136 | 1.76 | | |
| 20 | −84.972 | 5.52 | 1.8503 | 32.35 |
| 21 | −26.238 | | | |

Figure 8:
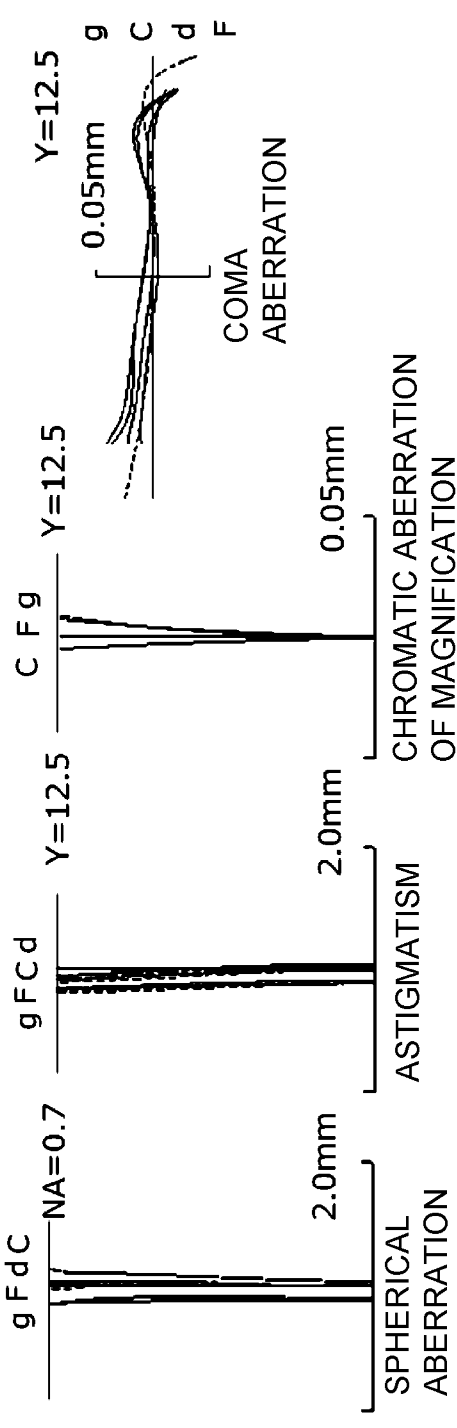
FIG. 8 is a diagram showing several kinds of aberration of the microscope objective lens according to the fourth example.

FIG. 8 is a diagram showing several kinds of aberration (spherical aberration, astigmatism, chromatic aberration of magnification, and coma aberration) of a microscope objective lens according to the fourth example. The aberration diagrams show that each aberration is favorably corrected in the microscope objective lens according to the fourth example even in the case of a large numerical aperture NA, and that thus the microscope objective lens according to the fourth example has excellent image-forming performance.

Figure 9:
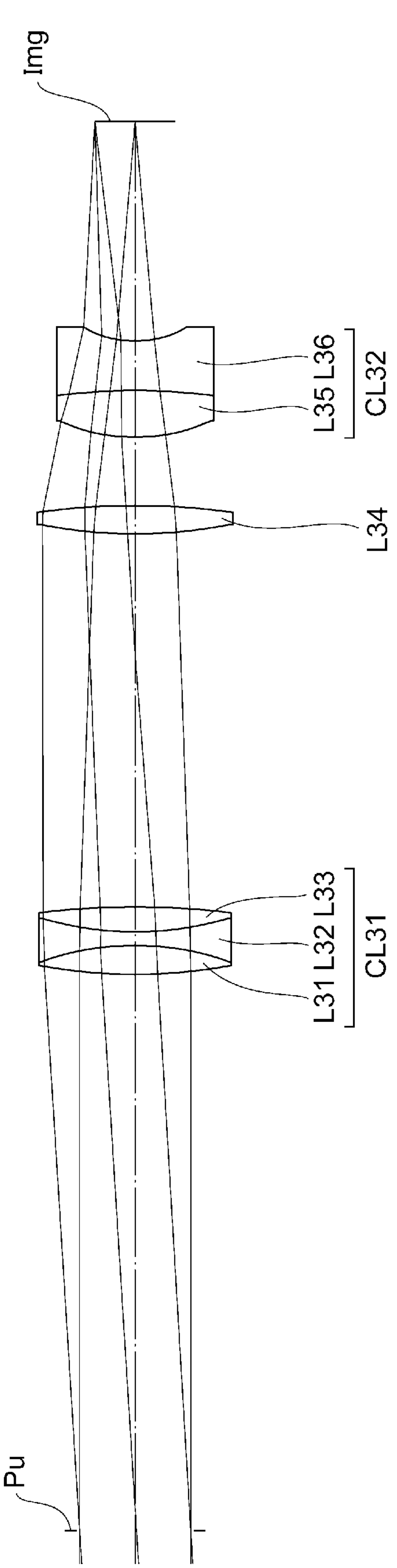
FIG. 9 is a cross-sectional diagram showing the configuration of an image formation lens.

Because the microscope objective lens according to each example is an infinity-corrected lens, it is combined, when used, with an image formation lens that forms an image of the object. Hence, an example of an image formation lens that is used in combination with the microscope objective lens will be described with reference to FIG. 9 and Table 5, FIG. 9 is a cross-sectional diagram showing the configuration of an image formation lens that is used in combination with the microscope objective lens according to each example. The diagrams of several kinds of aberration of the microscope objective lens according to each example were obtained in combination with this image formation lens. The image formation lens IL shown in FIG. 9 comprises, in order from the object side, a first cemented lens CL31 having a biconvex positive lens L31, a biconcave negative lens L32, and a biconvex positive lens L33, joined together; a biconvex positive lens L34; and a second cemented lens CL32 having a biconvex positive lens L35 and a biconcave negative lens L36 joined together. The image formation lens IL is located on the image side of the microscope objective lens according to each example. Note that the image surface Img is located on the image side of the second cemented lens CL32. The entrance pupil surface Pu of the image formation lens IL corresponds to the exit pupil surface of the infinity-corrected objective lens.

The following Table 5 shows the specification values of the image formation lens. Note that in the table of [Lens Data], the surface number, R, D, nd, and νd are the same as those explained in the foregoing Tables 1 to 4.

TABLE 5

[Lens Data]

| Surface Number | R | D | nd | νd |
|---|---|---|---|---|
| 1 | 143.588 | 8.80 | 1.4560 | 91.36 |
| 2 | −94.993 | 4.00 | 1.5638 | 60.71 |
| 3 | 89.827 | 7.60 | 1.4560 | 91.36 |
| 4 | −309.677 | 114.10 | | |
| 5 | 116.697 | 8.50 | 1.6477 | 33.73 |
| 6 | −363.426 | 21.00 | | |
| 7 | 56.818 | 9.30 | 1.5725 | 57.30 |
| 8 | −208.394 | 15.20 | 1.7380 | 32.33 |
| 9 | 33.862 | 67.04 | | |

Next, the table of [Conditional Expression Corresponding Value] is shown below. This table shows the values corresponding to the conditional expressions (1) to (5) for all examples (the first to fourth examples) together.

| | |
|---|---|
| Conditional Expression(1) | $14.0 \leq NA \times f$ |
| Conditional Expression(2) | $1.0 < H1/H0$ |
| Conditional Expression(3) | $0.45 \leq L1/TL \leq 0.75$ |
| Conditional Expression(4) | $0.75 \leq L2/TL \leq 0.90$ |
| Conditional Expression(5) | $0.75 < f1/f < 1.20$ |

[Conditional Expression Corresponding Value]

| Conditional Expression | 1st example | 2nd example | 3rd example | 4th example |
|---|---|---|---|---|
| (1) | 15.00 | 17.00 | 16.67 | 16.00 |
| (2) | 1.08 | 1.07 | 1.19 | 1.06 |
| (3) | 0.51 | 0.66 | 0.56 | 0.51 |
| (4) | 0.75 | 0.79 | 0.77 | 0.75 |
| (5) | 0.76 | 0.82 | 0.84 | 0.76 |

With each of the above examples, it is possible to achieve a microscope objective lens and microscope optical system having a wide field of view and high resolution.

Here, the above examples are to show specific examples of the embodiments, and hence the embodiments are not limited to these examples.

EXPLANATION OF NUMERALS AND CHARACTERS

G1 first lens group

G2 second lens group

The invention claimed is:

1. A microscope objective lens comprising:

in order from an object side: a first lens group that has positive refractive power and converts light flux from an object into convergent light flux; and a second lens group that has negative refractive power and receives the convergent light flux from the first lens group, wherein the second lens group comprises a first cemented lens and a second cemented lens which are placed next to each other, the first cemented lens is made of a first positive lens and a first negative lens having a concave surface on an image side, the first negative lens being placed on the image side of the first positive lens and is cemented to the first positive lens, the second cemented lens is placed on the image side of the first cemented lens, and the second cemented lens is made of a second negative lens having a concave surface on an object side and a second positive lens which is placed on the image side of the second negative lens, the second negative lens and the second positive lens being cemented with each other, and the conditional expressions as follows are satisfied:

$$14.0\ \text{mm} \leq NA \times f$$

$$1.0 < H1/H0$$

where NA represents a numerical aperture of the microscope objective lens, and NA≥0.75, f represents a focal length of the microscope objective lens, H1 represents a maximum height of a marginal ray from an on-axis object point in the first lens group, and H0 represents a height of the marginal ray at a lens surface closest to an image in the second lens group.

2. The microscope objective lens according to claim 1, wherein a conditional expression as follows is satisfied:

$$0.45 \leq L1/TL \leq 0.75,$$

where L1 represents a distance on an optical axis from a lens surface closest to the object in the first lens group to a lens surface at which the height of the marginal ray is largest in the first lens group, and TL represents a distance on the optical axis from the lens surface closest to the object in the first lens group to the lens surface closest to the image in the second lens group.

3. The microscope objective lens according to claim 1, wherein the second lens group converts the convergent light flux from the first lens group into parallel light flux.

4. The microscope objective lens according to claim 1, wherein the second lens group comprises, in order from the object side, a first lens component with a concave lens surface on an image side and a second lens component with a concave lens surface on the object side, and a conditional expression as is satisfied:

$$0.75 \leq L2/TL \leq 0.90,$$

where L2 represents a distance on an optical axis from a lens surface closest to the object in the first lens group to one lens surface, out of the lens surface on the image side of the first lens component and the lens surface on the object side of the second lens component, the height of the marginal ray being smaller at the one lens surface than at the other, and TL represents the distance on the optical axis from the lens surface closest to the object in the first lens group to the lens surface closest to the image in the second lens group.

5. The microscope objective lens according to claim 4, wherein the first lens component is located closest to the object in the second lens group, and the second lens component is located next to and on the image side of the first lens component.

6. The microscope objective lens according to claim 1, wherein a conditional expression as follows is satisfied:

$$0.75 < f1/f < 1.20,$$

where f1: the focal length of the first lens group.

7. A microscope device comprising the microscope objective lens according to claim 1.

8. A microscope optical system comprising the microscope objective lens according to claim 1, and an image formation lens that forms an image from light from the microscope objective lens.

9. The microscope objective lens according to claim 1, wherein the second lens group has a cemented lens at a closest position to the object side.

* * * * *